(12) United States Patent
Spath et al.

(10) Patent No.: US 11,603,894 B2
(45) Date of Patent: Mar. 14, 2023

(54) METHOD FOR ADAPTING A BITING POINT FILLING TIME OF A HYDRAULICALLY ACTUATED HYBRID DISENGAGING CLUTCH

(71) Applicant: ZF Friedrichshafen AG, Friedrichshafen (DE)

(72) Inventors: Lukas Spath, Schonungen (DE); Robert Weissenrieder, Knetzgau (DE); Markus Terwart, Thundorf (DE); Moghtader Salehan, Schweinfurt (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/852,631

(22) Filed: Jun. 29, 2022

(65) Prior Publication Data
US 2023/0003268 A1 Jan. 5, 2023

(30) Foreign Application Priority Data
Jun. 30, 2021 (DE) .......................... 102021206813.8

(51) Int. Cl.
*F16D 48/08* (2006.01)
*F16D 48/06* (2006.01)

(52) U.S. Cl.
CPC .......... *F16D 48/08* (2013.01); *F16D 48/066* (2013.01); *F16D 2500/1026* (2013.01); *F16D 2500/1066* (2013.01); *F16D 2500/10412* (2013.01); *F16D 2500/50251* (2013.01); *F16D 2500/50281* (2013.01)

(58) Field of Classification Search
None
See application file for complete search history.

(56) References Cited

U.S. PATENT DOCUMENTS

| 9,233,684 | B2 | 1/2016 | Park | |
|---|---|---|---|---|
| 2012/0158264 | A1* | 6/2012 | Kuras | F16D 48/066 |
| | | | | 701/67 |

(Continued)

FOREIGN PATENT DOCUMENTS

| DE | 102005016672 A1 | 10/2006 |
|---|---|---|
| DE | 102010003922 A1 | 10/2011 |

(Continued)

OTHER PUBLICATIONS

German Search Report DE 10 2021 206 813.8, dated March 21, 2022. (14 Pages).

*Primary Examiner* — Timothy Hannon
(74) *Attorney, Agent, or Firm* — Dority & Manning, P.A.

(57) ABSTRACT

A method for adapting a biting point filling time of a hydraulically actuated hybrid disengaging clutch is implemented step by step during driving of the motor vehicle via a plurality of selected engagement phases of the hybrid disengaging clutch with a manipulation of the customary rapid filling routine. Proceeding from an initially stored biting point filling time, a filling time which is shortened in comparison with this for a subsequent rapid filling routine is increased step by step, in each case by an increment. Here, an actual value which is set in each case for a test parameter, from which a change in the transmission of torque of the hybrid disengaging clutch can be derived, is detected until the actual value corresponds to a setpoint value.

11 Claims, 1 Drawing Sheet

(56) References Cited

U.S. PATENT DOCUMENTS

| | | | |
|---|---|---|---|
| 2014/0207350 A1* | 7/2014 | Dix | F16D 25/14 |
| | | | 701/68 |
| 2014/0277978 A1* | 9/2014 | Versteyhe | F16D 48/066 |
| | | | 701/68 |
| 2017/0343064 A1* | 11/2017 | Lienhard | B60W 20/20 |

FOREIGN PATENT DOCUMENTS

| | | |
|---|---|---|
| DE | 102012102276 A1 | 9/2013 |
| DE | 102012224278 A1 | 3/2014 |
| DE | 102016215855 A1 | 3/2017 |
| DE | 102016215787 A1 | 3/2018 |
| DE | 102016219376 A1 | 4/2018 |
| DE | 102017211189 A1 | 1/2019 |
| DE | 102018215848 A1 | 3/2020 |

\* cited by examiner

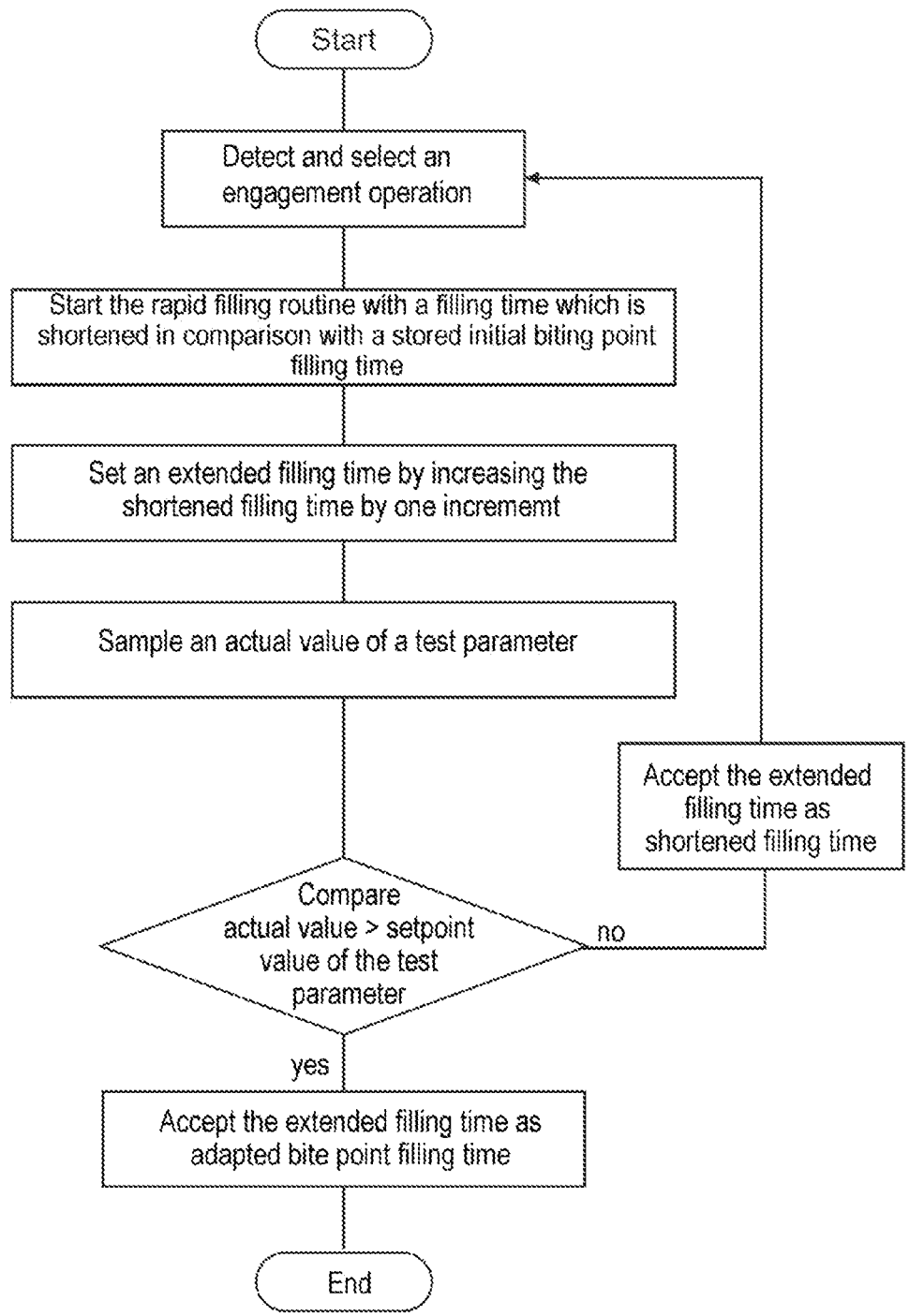

METHOD FOR ADAPTING A BITING POINT FILLING TIME OF A HYDRAULICALLY ACTUATED HYBRID DISENGAGING CLUTCH

CROSS-REFERENCE TO RELATED APPLICATIONS

The present application is related and claims priority to 102021206813.8 filed in the German Patent Office on Jun. 30, 2021, which is incorporated by reference in its entirety for all purposes.

FIELD OF THE INVENTION

The invention relates generally to a method, by way of which the filling time of a hydraulically actuated hybrid disengaging clutch in a hybrid drive train of a motor vehicle is adapted repeatedly, in order to move the hybrid disengaging clutch into a biting point position at the end of a rapid filling operation of an engagement phase.

BACKGROUND

It is a common feature of the different hybrid drive trains which are known from the prior art that the hybrid drive trains have an internal combustion engine, an electric machine, a transmission and at least one disengaging clutch. A disengaging clutch is arranged in a functionally active manner here between the internal combustion engine and the electric machine and/or the internal combustion engine and the transmission.

In one typical embodiment of a parallel hybrid drive, the electric machine is arranged between the internal combustion engine and the transmission, a disengaging clutch (called a hybrid disengaging clutch here) being arranged between the internal combustion engine and the electric machine.

In the open state of the hybrid disengaging clutch, the output shaft of the internal combustion engine is decoupled in a functionally active manner from the input shaft of the electric motor. In the closed state of the hybrid disengaging clutch, the output shaft of the internal combustion engine is coupled in a functionally active manner to the input shaft of the electric motor.

Here, the motor vehicle is operated in the "electric driving" or "recuperation" operating modes without the high drag torque of the internal combustion engine, by the hybrid disengaging clutch being open. The power output of the electric machine can be selected independently of the internal combustion engine. In the closed state of the hybrid disengaging clutch, the internal combustion engine and the electric machine are connected at the same time to the transmission, whereby the torques which are generated are added together.

An important characteristic variable of a clutch, and thus also of a hydraulically actuated hybrid disengaging clutch, is the biting point, also called the coupling point or touch point.

The closure of a hydraulically actuated clutch takes place during an engagement operation via the displacement of a cylinder piston, connected to the clutch, in a hydraulic cylinder, by a locking chamber of the hydraulic cylinder, in which the cylinder piston is guided, being filled with a fluid under a filling pressure. In order to set a desired setting pressure on the clutch, the locking chamber is filled over a predefined filling time with a filling pressure which is higher than a filling pressure which correlates with the setting pressure, and is then sealed with respect to the hydraulic pump. As an alternative, a filling pressure which correlates with the desired setting pressure might also be applied, the setting pressure having been set after a minimum filling time and being maintained.

In order to keep the engagement operation as brief as possible, that is to say the time between the coupling intention and the closure of the clutch, the clutch is moved into a biting point position in a rapid filling routine, including a rapid filling phase and a filling phase, that is to say the piston is displaced into a position, in which the clutch is situated at the biting point and from which only a very small displacement travel is still necessary until the clutch disks or clutch plates are pressed completely against one another, whereby the clutch is closed. Here, a high rapid filling pressure pulse is first of all output to the locking chamber in the rapid filling phase, whereupon the cylinder piston is set rapidly in movement, in a manner which is delayed slightly. Before the cylinder piston arrives in the biting point position, the filling pressure is lowered to a known level in the filling phase. The duration of the rapid filling routine corresponds to the filling time. Here, in knowledge of the filling pressure, the filling time is selected during the rapid filling phase and the filling phase in such a way that a setting pressure acts on the hybrid disengaging clutch at the end of the filling time, at which setting pressure said hybrid disengaging clutch has arrived in the biting point position.

If the filling is continued, the clutch is immediately closed.

The filling time which is relevant for the biting point position of the piston and/or the setting of the biting point of the clutch is called a biting point filling time.

Setting of the biting point and therefore the biting point filling time which is as precise as possible is required, in order to set an optimum friction pressure on the disengaging clutch. The setting of a filling time which is less or greater than the biting point filling time leads, inter alia, to an excessively low or an excessively high breakaway gradient of the internal combustion engine, for which reason the biting point pressure is an essential characteristic variable for a performant actuation of the disengaging clutch.

The biting point is merely approximately identical for identical clutches, that is to say clutches of the same type and same dimensions, and differs specifically for the individual clutches on account of component and assembly tolerances, for example, of the clutch components, the hydraulic cylinders, the pumps, the hydraulic lines and the valves. Therefore, a specific biting point filling time has to be determined and set separately and precisely for each individual clutch at an identical applied filling pressure. The determination of a specific biting point filling time is initially carried out, for example, at the end of the transmission production, what is known as the EOL. The initial biting point filling time is then stored in the memory of a control unit which is assigned to the drive train.

Despite a transmission-specific and clutch-specific determination of the biting point and a correspondingly individual adaptation of the actuating parameters of the clutch, such as the biting point filling time, it can happen after final assembly of a motor vehicle that problems occur during driving operation, which problems are to be ascribed to a shift of the biting point with respect to the initial biting point, which makes itself felt, for example, by way of jerks during driving operation.

DE 10 2018 215 848 A1 has disclosed a method, by way of which the biting point of a disengaging clutch is determined individually during the initial driving operation of each motor vehicle. The motor torque in the case of an open clutch is determined and stored as reference value. The clutch is then closed, a pressure which corresponds to an initial biting point being set in a rapid filling phase at an elevated rapid filling pressure. After a brief filling equalization phase, a pressure rise phase is started at a first time, an increase in the torque which is transmitted by way of the clutch occurring until the threshold torque is reached. The specific biting point for the clutch can be determined after the installation in the motor vehicle from the time duration between the initial biting point being set and the threshold torque being reached. The method described herein is designed exclusively for being carried out outside regular driving operation, and is therefore carried out during the initial vehicle operation.

The biting point for a clutch also changes, however, over the service life of a motor vehicle on account of wear, ageing, running-in behavior of components or the replacement of components, the biting point filling time as a rule becoming higher, apart from in the case of a replacement of components. The setting pressure, by way of which the clutch is set to the biting point, therefore has to be adapted repeatedly over the service life of the motor vehicle, which takes place via an adaptation of the biting point filling time. To this end, the actual biting point filling time has to be determined. Here, the starting point is as a rule in each case the initial biting point filling time, and a filling offset is determined, by which the initial biting point filling time is corrected, in order to obtain an adapted biting point filling time which is then used until the next adaptation when the biting point filling time is retrieved in the control unit. By way of known methods, the adaptation is carried out during the standstill of the vehicle or else while driving outside regular engagement operations, which frequently leads to the disruption of the driving comfort.

SUMMARY OF THE INVENTION

Example aspects of the invention provide a method, by way of which the biting point of a hydraulically actuated hybrid disengaging clutch is adapted during regular driving operation repeatedly during the life cycle of a motor vehicle, without the driving comfort being disrupted for the vehicle driver.

The necessary filling time for moving a hydraulically actuated clutch into the biting point position is called a biting point filling time in the following text. The term "adaptation" describes the adaptation of system parameters to system-specific and current conditions, in order to ensure a consistent system behavior. The biting point is understood to mean that point at which the clutch just comes into contact, but no appreciable torque is yet transmitted. The clutch disks or clutch plates are set against one another under the action of a setting pressure on the clutch at the level of a biting point pressure, in such a way that the clutch is closed by way of the following increase in the setting pressure which acts, and can immediately transmit a torque.

For a method for adapting a biting point filling time of a hydraulically actuated hybrid disengaging clutch which is arranged in a hybrid drive train of a motor vehicle between an internal combustion engine and an electric machine, the object is achieved by way of the following.

The method begins with the detecting of engagement operations of the hybrid disengaging clutch during the driving operation of the motor vehicle, and the selecting of one of the engagement operations. In each case one hydraulic system which actuates the hybrid disengaging clutch is filled with a fluid in a rapid filling routine, including a rapid filling phase and a filling phase, during the engagement operations.

The rapid filling routine is implemented during a selected engagement operation. In the rapid filling routine, the hydraulic system can be filled, over a filling time, either at a constantly prevailing pressure or a known changing pressure. For instance, the filling can be started rapidly by way of a high constant pressure pulse in a rapid filling phase, and can be continued in a subsequent filling phase at a lower predefined filling pressure. The filling time either corresponds, in the case of a first adaptation, to a filling time which is shortened in comparison with a stored initial biting point filling time, or, in the case of adaptations which have already been implemented, corresponds to a filling time which is shortened with respect to an adapted biting point filling time which has been determined most recently.

The shortened filling time is increased by a predetermined increment to an extended filling time, and the actual value which is set for a test parameter, from which a transmission of torque by way of the hybrid disengaging clutch can be derived directly or indirectly, is sampled.

The actual value is compared with a setpoint value which is stored for the test parameter, the extended filling time being used as adapted biting point filling time for subsequent, non-selected engagement operations if the actual value is greater than or equal to the setpoint value, and the extended filling time being used as shortened filling time for a repeated implementation of method step b, and method steps a to d being repeated if the actual value is smaller than the setpoint value.

The extended filling time is advantageously stored as adapted biting point filling time if the actual value is greater than or equal to the setpoint value.

As an alternative, a difference between the extended filling time and the initial biting point filling time is formed and is stored as a filling time offset if the actual value is greater than or equal to the setpoint value, and the adapted biting point filling time is determined in each case from the initial biting point filling time and one of the stored filling time offsets.

The increment can be equally large for the selected coupling operations, but is increasingly smaller for the selected engagement operations which follow one another, whereby the biting point filling time can be determined in an increasingly more precise manner.

It is also advantageous if at least one further test parameter, from which a transmission of torque by way of the hybrid disengaging clutch can be derived directly or indirectly, is sampled and is compared with a setpoint value.

The test parameter or one of the further test parameters is advantageously a gradient change in a rotational speed of an electric machine which is connected to the hybrid disengaging clutch.

As an alternative, the test parameter or one of the further test parameters is a change in a torque for rotational speed regulation of an electric machine which is connected to the hybrid disengaging clutch.

In a further alternative, the test parameter or one of the further test parameters is a change in a balanced torque on an electric machine which is connected to the hybrid disengaging clutch.

In order for it to be possible for the adaptation of the biting point to be implemented in a manner which is unnoticed by the vehicle driver, the duration of the engagement operations which correspond in each case to a restarting phase of the internal combustion engine has been found to be a time which is suitable for this purpose. This time happens repeatedly over the life cycle of a motor vehicle, even multiple times during one journey if the internal combustion engine is regularly switched on in addition to the electric machine. In order that the driving comfort for the vehicle driver is not disrupted, an engagement operation is used for implementation only when the brief retardation of the engagement operation is acceptable. For example, it might be deduced from the manner of the actuation of the accelerator pedal by way of the vehicle driver whether an immediate acceleration is required, as in the case of sporty overtaking or an evasive maneuver. An engagement operation of this type is then not included by the method.

One particular special feature of the method according to example aspects of the invention then consists in the fact that the method is not implemented within a single clutch operation, but fundamentally proceeds over a plurality of clutch operations. In fundamentally a plurality of repeating method steps, the rapid filling routine, as has been explained for a regular implementation in the description of the prior art, is manipulated in each case during regular engagement operations. Sequential engagement operations without a break do not have to be used to this end, but rather merely selected engagement operations. That is to say, engagement operations of the type which the on-board computer system identifies, for example, as "sporty" are not used for this purpose, in order not to influence the intended driving behavior by way of retardations.

The method according to example aspects of the invention takes place independently of the intentions of the vehicle driver and unnoticed by him/her.

BRIEF DESCRIPTION OF THE DRAWING

In the following text, example aspects of the invention will be explained in greater detail using one exemplary embodiment on the basis of the drawing, in which:

FIG. 1 shows a flow chart.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

The method according to example aspects as a rule takes place in a plurality of repeating method steps, for which in each case the rapid filling routine of engagement operations which take place regularly and successively during driving of a motor vehicle is utilized. Here, the customary rapid filling routine is in each case manipulated, and a filling offset is determined iteratively with respect to an initial biting point filling time in the case of a first adaptation or with respect to a previously adapted biting point filling time in the case of a repeated implementation of the method (repeated adaptation). A filling offset is in each case the difference, which changes over the service life of the vehicle, between the initial biting point filling time and an adapted biting point filling time which has to be set, in order to set the disengaging clutch as precisely as possible to the biting point. The changing biting point filling time is determined by the method and is set as an adapted biting point filling time in the case of subsequent engagement operations on the disengaging clutch.

By way of the engagement operation of a hybrid disengaging clutch, an active attachment operation of an internal combustion engine to an electric machine of a hybrid drive train of a motor vehicle takes place. The engagement operation includes a rapid filling routine, as a rule with a rapid filling phase and a filling phase, and a subsequent clutch phase. In a rapid filling routine which takes place regularly, the disengaging clutch is filled over a predefined filling time with a fluid at a predetermined filling pressure in the rapid filling phase and in the filling phase, a setting pressure which is determined by the filling time being set at the disengaging clutch. Here, the filling time corresponds to the initial biting point filling time or a biting point filling time which has already previously been adapted.

In contrast to this, in the case of a rapid filling routine which is manipulated according to example aspects of the invention, the hybrid disengaging clutch is filled by way of a filling time which is shortened with respect to an initial biting point filling time or a previously adapted biting point filling time and is approximated iteratively in directly or indirectly subsequent rapid filling routines of selected engagement operations to the initial or possibly the already previously adapted biting point filling time, as has to be set at this time in order to set the biting point of the clutch.

In the following text, the procedure of the method (shown in FIG. 1 as a flow chart) will be explained.

In a manner which has preferably been pre-programmed at the factory, the method begins by, for example, the engagement operations being detected, from a defined odometer value of the motor vehicle, and being checked automatically for suitability for use for the implementation of the method. After the determination of the suitability of an engagement operation, the latter is selected for the implementation of the method, and the rapid filling routine is carried out on a hydraulic system which actuates the hybrid disengaging clutch.

During the rapid filling phase, over a predefined filling time, the locking chamber of the hydraulic system is first of all filled proportionately with a fluid under a rapid filling pressure (rapid filling pulse), before the rapid filling pressure is lowered to a lower known filling pressure and the hydraulic system is filled further over a remaining rest of the predetermined filling time. Here, the filling time is shorter than the initial biting point filling time or possibly already determined adapted biting point filling time, after which a setting pressure which correlates with the biting point has been set on the disengaging clutch.

The hybrid disengaging clutch is then applied further by a step, that is to say the shortened filling time is increased by an increment to an increased filling time. After only a short waiting time, in which a setting pressure which correlates with the increased filling time has been set at the clutch, an actual value which is set for a selected test parameter is detected, from which a change in the transmission of torque by way of the hybrid disengaging clutch can be derived directly or indirectly. This can be, for example, a gradient change of the rotational speed of the electric machine, a change in the torque for rotational speed regulation of the electric machine, or a change in the balanced torque at the electric machine. The actual value which is set of the test parameter is compared with a setpoint value which is stored for the test parameter. The setpoint value correlates with beginning transmission of torque, which is not yet significant, by way of the disengaging clutch when the disengaging clutch is situated in the biting point position.

In the case of the actual value being identical to the setpoint value, it can be concluded that the increased setting pressure which correlates with the increased filling time corresponds to the biting point pressure. Should the determined actual value have already exceeded the setpoint value, it can be concluded that the actual biting point filling time lies within the change range of the filling time. In order to determine the actual biting point as precisely as possible, the magnitude of the change in the filling time (increment) is selected to be very small, with the result that, in further method steps, the filling time approaches the actual biting point filling time iteratively from below over a large number of small steps. In the case of the setpoint value being reached by way of an actual value, the assumption is then made that the increased filling time has reached the actual biting point filling time. The smaller a magnitude of the increment, by which the filling time is increased in each case, the more precisely the actual biting point filling time can ultimately be determined and utilized as an adapted biting point filling time for further regular engagement operations.

If, after a first increase in the filling time, a beginning transmission of torque cannot yet be derived from the actual value of the parameter, which corresponds to the norm, the extended filling time is stored for a continuation of the method in a later method step which takes place during a later clutch operation, whereby the current clutch operation is not delayed any longer. In addition, in a manner which is assigned to this, the detected actual value of the detected parameter is stored. The current engagement operation is now concluded.

A next suitable engagement operation is selected, in the case of which the directly previously set extended filling time forms the starting point. This is increased by an increment in an analogous manner with respect to the previous engagement operation utilized for the method. Here, the magnitude of the increment, by which in each case the filling time is increased per engagement operation, can be identical, or it becomes increasingly smaller, whereby the actual biting point filling time can be determined very precisely with a comparatively small number of iteration steps. Subsequently, the actual value of the parameter is detected again, from which a change in the transmission of torque by way of the disengaging clutch can be derived directly or indirectly and can be compared with the stored setpoint value for the parameter.

Further adaptation attempts follow in each case in a subsequent clutch phase until the respective actual value for the detected parameter corresponds to the setpoint value. The extended filling time which is then set is adopted as the actual biting point filling time at the detection time and is stored (adapted biting point filling time). The adapted biting point filling time is then set for all subsequent clutch phases.

It goes without saying that the change of two relevant parameters can also be tracked and analyzed during the method. In this way, the value comparison of one parameter can be verified.

The method can be repeated again and again over the service life of the vehicle, the most recently adapted biting point filling time then in each case forming the starting point. It is advantageous here, instead of the respective determined biting point filling time, to store in each case the filling offset, and to then determine the last adapted biting point filling time in each case from the initial biting point filling time and the most recently stored biting point offset.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

The invention claimed is:

1. A method for adapting a biting point filling time of a hydraulically actuated hybrid disengaging clutch arranged in a hybrid drive train of a motor vehicle between an internal combustion engine and an electric machine, the method comprising:
   a) detecting engagement operations of the hybrid disengaging clutch during a driving operation of the motor vehicle, in each of the engagement operations a hydraulic system actuating the hybrid disengaging clutch is filled with fluid in a rapid filling routine, and selecting one of the engagement operations;
   b) implementing the rapid filling routine of the selected one of the engagement operations, the hydraulic system filled during the rapid filling routine of the selected one of the engagement operations with a predetermined filling pressure over a filling time that corresponds to either,
      in a first adaptation, a filling time shortened relative to a stored initial biting point filling time, or,
      in a later adaptation after the initial adaption, a filling time shortened relative to a most recently determined biting point filling time;
   c) increasing a shortened filling time by a predetermined increment to an extended filling time, and sampling an actual value for a test parameter, a transmission of torque via the hybrid disengaging clutch derivable directly or indirectly by the test parameter; and
   d) comparing the actual value for the test parameter with a setpoint value stored for the test parameter,
   wherein either the extended filling time is used as an adapted biting point filling time for subsequent, non-selected engagement operations when the actual value is greater than or equal to the set-point value, or the extended filling time is used as the shortened filling time for a repeated implementation of the step b), and steps a) through d) are repeated when the actual value is less than the setpoint value.

2. The method of claim 1, further comprising storing the extended filling time as the adapted biting point filling time when the actual value is greater than or equal to the setpoint value.

3. The method of claim 1, further comprising:
   calculating and storing a difference between the extended filling time and the initial biting point filling time as a filling time offset when the actual value is greater than or equal to the setpoint value; and
   determining the adapted biting point filling time from the initial biting point filling time and the stored filling time offset.

4. The method of claim 1, wherein an increment is specified to be increasingly smaller for sequential selected engagement operations.

5. The method of claim 1, further comprising:
sampling actual values for at least one further test parameter that the transmission of torque via the hybrid disengaging clutch is derivable directly or indirectly; and
comparing each of the at least one further test parameter with a respective additional setpoint value stored for at least one test parameter.

6. The method of claim 5, wherein the test parameter or the at least one further test parameter comprises a gradient change in a rotational speed of the electric machine connected to the hybrid disengaging clutch.

7. The method of claim 5, wherein the test parameter or the at least one further test parameter comprises a change in a torque for rotational speed regulation of the electric machine connected to the hybrid disengaging clutch.

8. The method of claim 5, wherein the test parameter or the at least one further test parameter comprises a change in a balanced torque on the electric machine connected to the hybrid disengaging clutch.

9. The method of claim 1, wherein the test parameter is a gradient change in a rotational speed of the electric machine connected to the hybrid disengaging clutch.

10. The method of claim 1, wherein the test parameter is a change in a torque for rotational speed regulation of the electric machine connected to the hybrid disengaging clutch.

11. The method of claim 1, wherein the test parameter is a change in a balanced torque on the electric machine connected to the hybrid disengaging clutch.

\* \* \* \* \*